United States Patent [19]
Chen

[11] Patent Number: 5,828,299
[45] Date of Patent: Oct. 27, 1998

[54] CAR DOOR WARNING SYSTEM

[76] Inventor: Ing-Wen Chen, No. 23, Lane 207, Kao-Feng Road, Hsin-Chu, Taiwan

[21] Appl. No.: 791,274

[22] Filed: Jan. 30, 1997

[51] Int. Cl.$^6$ ...................................................... B60Q 1/26
[52] U.S. Cl. ......................... 340/468; 340/457; 340/426; 340/473; 340/545; 307/10.1; 307/10.2; 307/10.8; 180/287; 200/61.44
[58] Field of Search .................... 340/457, 468, 340/425.5, 426, 547, 540, 545, 430, 431, 568, 693, 473, 321, 541; 307/49.1, 10.1, 10.8, 10.2; 116/28 R; 180/287; 200/61.44

[56] References Cited

U.S. PATENT DOCUMENTS

| | | | |
|---|---|---|---|
| 3,596,240 | 7/1971 | Atkins | 340/457 |
| 3,646,511 | 2/1972 | Holt | 340/457 |
| 3,649,960 | 3/1972 | Severn | 340/457 |
| 3,697,943 | 10/1972 | Andres | 340/457 |
| 5,121,098 | 6/1992 | Chen | 340/457 |
| 5,321,309 | 6/1994 | Kolomyski | 307/10.8 |
| 5,602,526 | 2/1997 | Read | 340/457 |

*Primary Examiner*—Nina Tong
*Attorney, Agent, or Firm*—Pro-Techtor International Services

[57] ABSTRACT

The present invention relates to a car door warning system for use in a car door and warning against inadvertent opening of the car door, including: a warning device with at least one lighting device; a switch, mounted close to the handle of the car door and operated, when the handle is moved in order to open the car door; and wiring, electrically connecting the warning device with the switch; wherein moving the handle in order to open the car door causes an elecrical signal to pass through the wiring to the warning device, such that the lamp is lighted, generating an effective warning signal to prevent an accident.

7 Claims, 6 Drawing Sheets

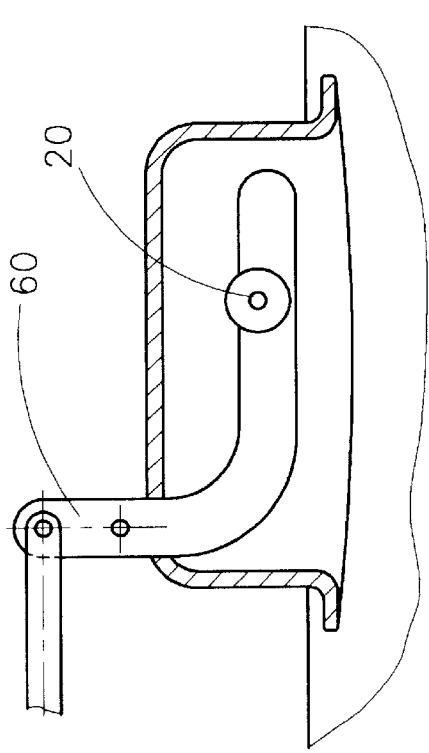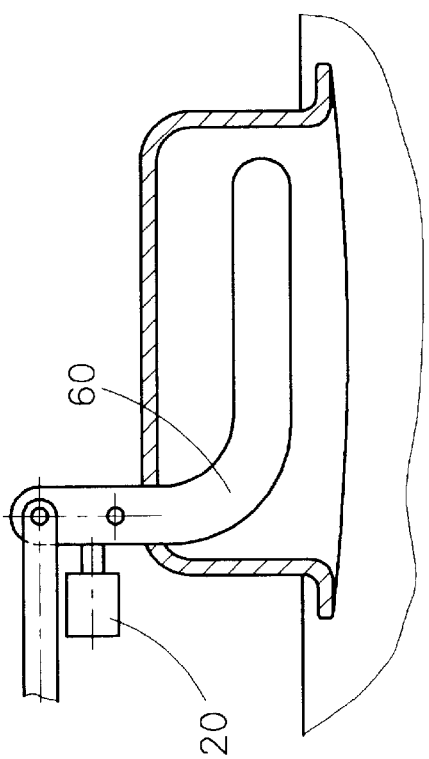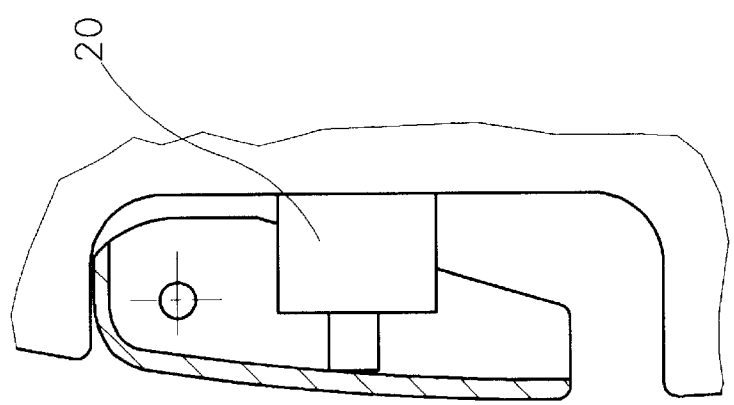

CAR DOOR WARNING SYSTEM

BACKGROUND OF THE INVENTION

1. Field of the Invention

The present invention relates to a car door warning system, particularly to a warning system, which is installed at the handle of a car door, alerting against inadvertent opening of a car door.

2. Description of Related Art

In the design of conventional car doors, the hazard brought by inadvertent opening of the doors has mostly not been considered. Sudden opening of the car doors, as often done by careless or curious children, may lead to accidents. Other dangerous situations include inadvertent opening of car doors while driving or sudden opening of car doors after parking the car. A warning signal to the car passengers and passers-by helps to prevent accidents.

SUMMARY OF THE INVENTION

An object of the present invention is to provide a warning system, which warns car passengers and passersby, before a car door is opened, so as to prevent accidents caused by suddenly and inadvertently opened car doors.

Another object of the present invention is to provide a warning system, which provides an effective alarm signal to car passengers and passers-by, before a car door is opened.

A further object of the present invention is to provide an alarm of simple structure and easy producibility.

The present invention can be more fully understood by reference to the following description and accompanying drawings.

BRIEF DESCRIPTION OF THE DRAWINGS

FIG. 6 is a schematic illustration of the switch of the present invention, installed additionally next to the handle of a car door.

FIG. 7 is a schematic illustration of the switch with the connecting mechanism of the present invention, integrated into the handle of a car door.

FIG. 8 is a schematic illustration of the switch with the connecting mechanism of the present invention, integrated into the handle of a car door, in another embodiment.

DETAILED DESCRIPTION OF THE PREFERRED EMBODIMENTS

Figure 1:
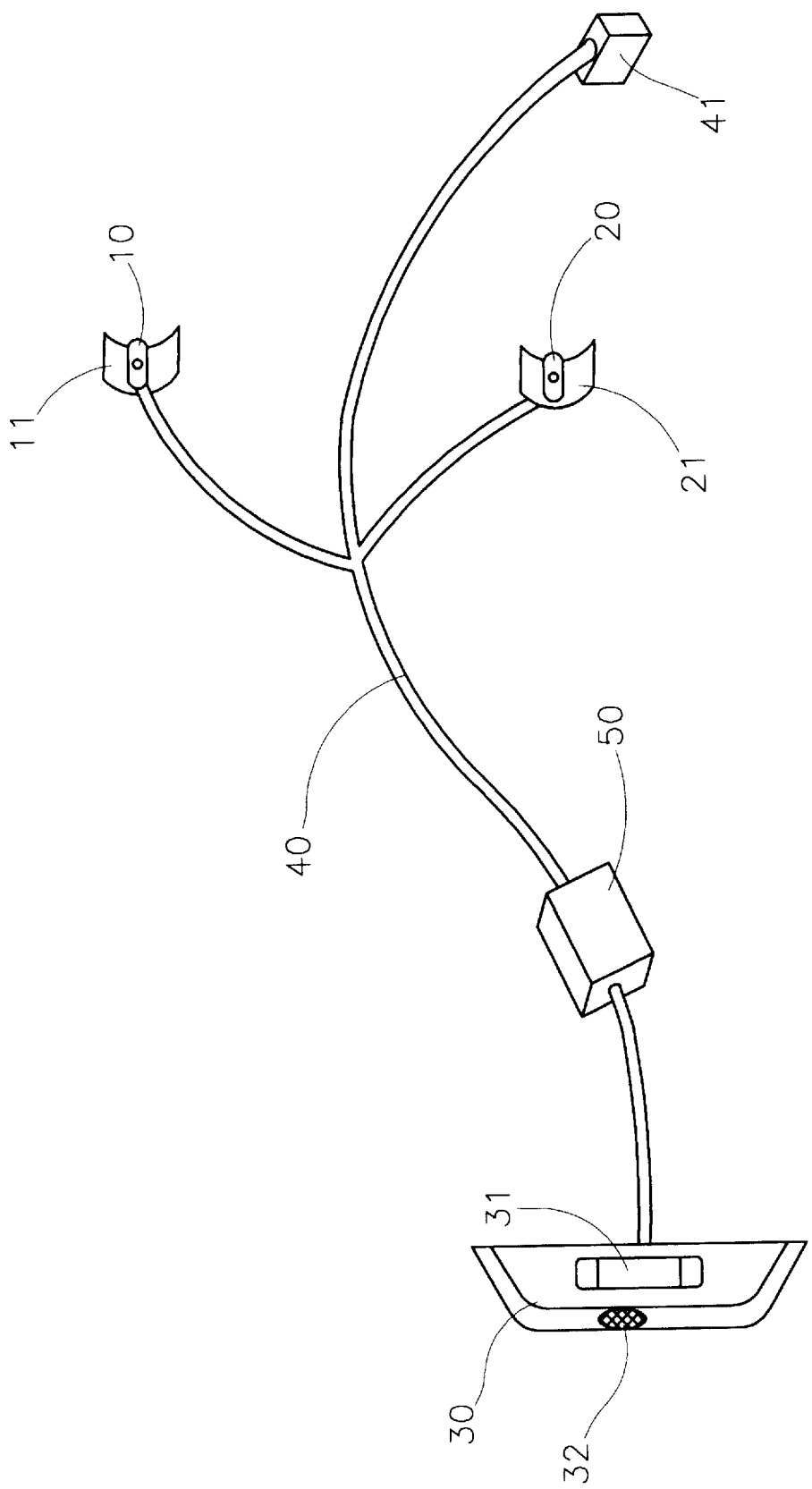
FIG. 1 is a schematic illustration of the car door warning system of the present invention.

Referring to FIG. 1, the car door warning system of the present invention in a first embodiment mainly comprises: a first switch 10, mounted on the inner handle of a car door; a second switch 20, mounted on the outer handle of a car door; a warning device 30 for generating a warning signal; and wiring 40, connecting the first switch 10, the second switch 20, and the warning device 30.

As shown in FIG. 1, the car door warning system of the present invention is suitable for installation in every type of car. The first switch 10 and the second switch have attachment devices 11 and 21, respectively. The attachment devices 11, 21 are gluey plates attached to the car doors at a position that is suitable to operate the switches 10, 20, when the door handle is moved (as shown in FIG. 6).

Figure 3:
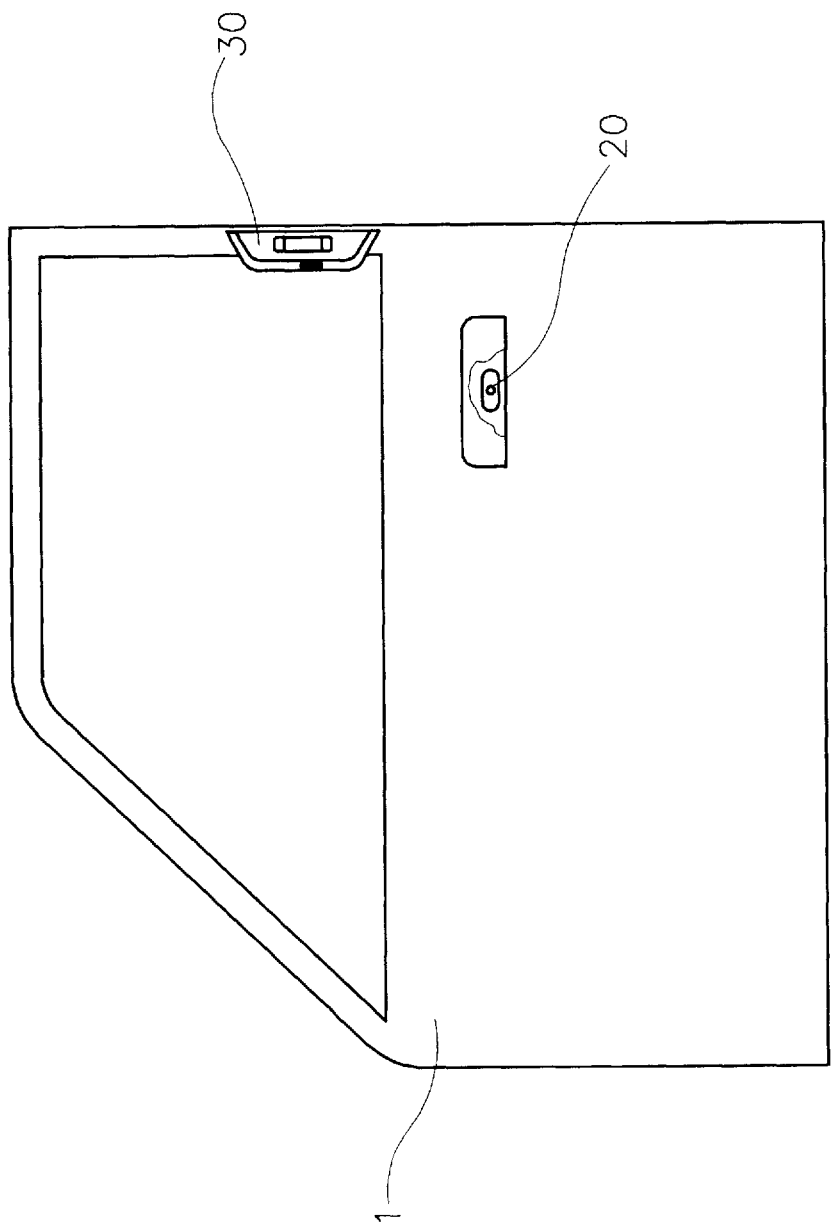
FIG. 3 is a schematic illustration of the installation of the present invention in a car door.

Referring to FIG. 3, the first switch 10 is by the attachment device 11 attached to the inner side of a car door behind the handle, and the second switch 20 is by the attachment device 21 attached to the outer side of a car door behind the handle. When the inner or outer handle are moved, the first switch 10 or the second switch 20 causes a signal to pass through the wiring 40 to the warning device 30. The warning device 30 is mounted at a highly visible position inside or outside the car.

Figure 5:
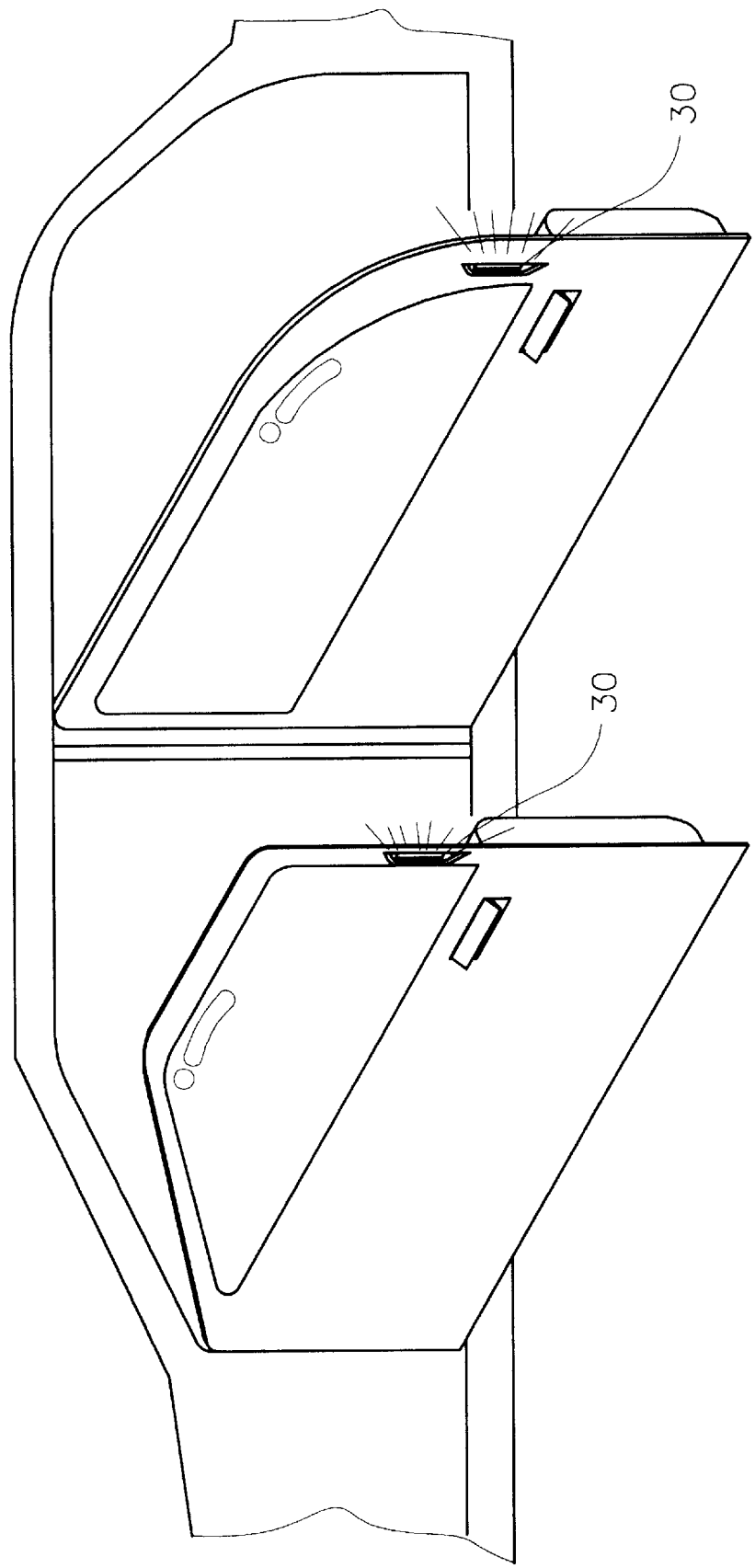
FIG. 5 is a schematic illustration of the installation of the present invention on the outside of car doors.

The warning device 30 has a lamp 31 and a sound generator 32. Upon receiving a signal enabled by the first switch 10 or the second switch 20, the lamp 31 and the sound generator 32 send off signals (as shown in FIG. 5), so as to discourage car passengers from opening the car door and to caution passers-by from behind against coming close.

Figure 4:
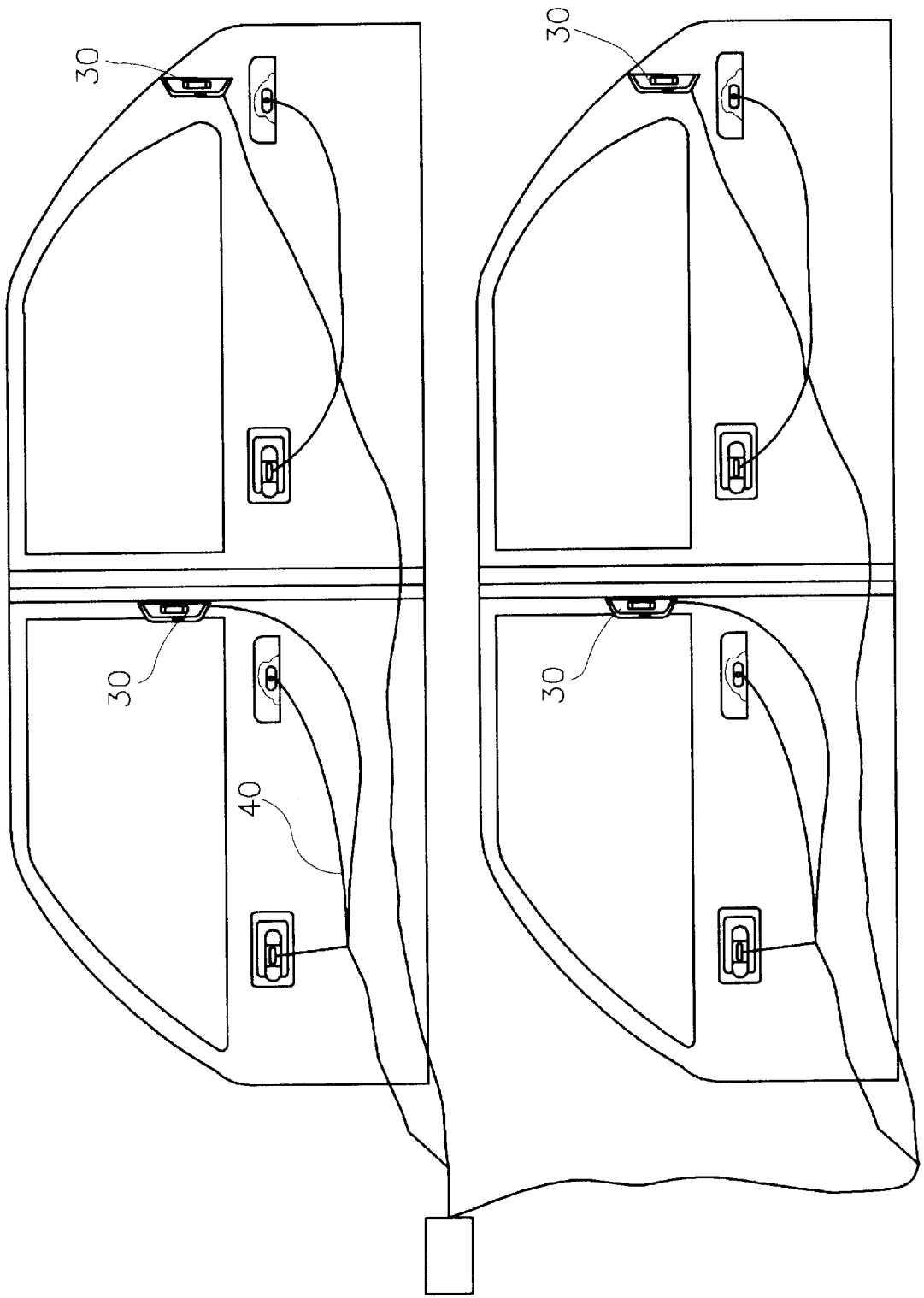
FIG. 4 is a schematic illustration of the installation of the present invention in all car doors.

The wiring 40 has a connector 41, which connects the warning system to a power supply. As shown in FIG. 4 and 5, every door is connectable separately to a warning system. Then a set of parallel wirings 40 for each door is provided, with separate first switches 10, second switches 20 and warning devices 30 for each door. Furthermore, the wiring 40 has a flash generator 50 for supplying the lamp 31, thus increasing the warning effectiveness thereof.

The first and second switches 10, 20 are sensitive to moving the door handles, even before the door itself is opened. So the warning signals are issued before any dangerous situation from opening doors arises. Thus the inadvertent opening of doors is effectively prevented.

Figure 2:
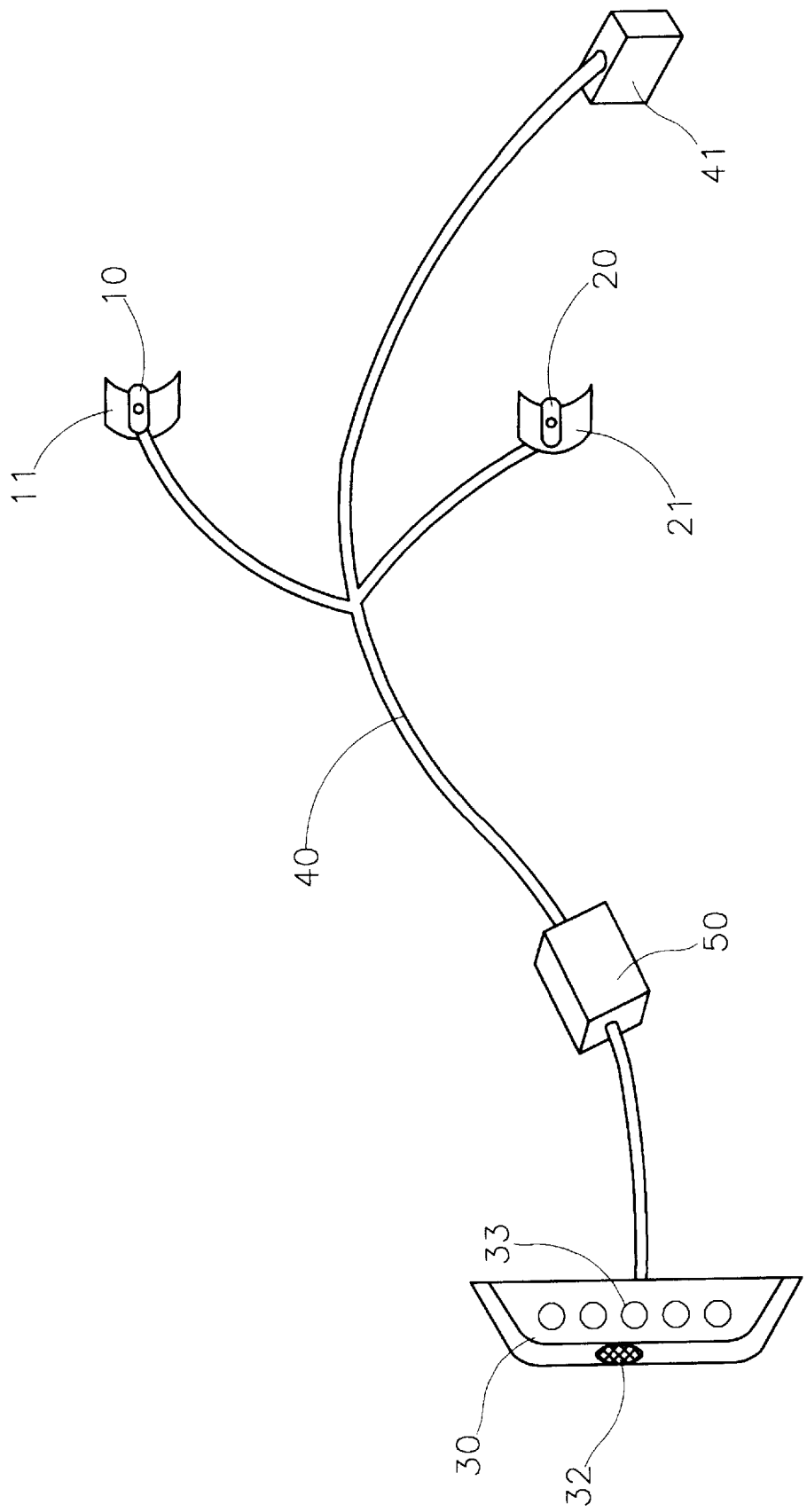
FIG. 2 is a schematic illustration of the car door warning system of the present invention in another embodiment.

Referring to FIG. 2, the car door warning system of the present invention in a second embodiment has light emitting diodes 33 (LED) substituted for the lamp 31, achieving the same warning effect.

The switches of the car door warning system of the present invention can be integrated into the car door. As shown in FIGS. 7 and 8, the first and second switches 10, 20 are attached to the handlebar 60 of the car door. When the door handle is operated, the movement of the connecting bar 60 is sensed by the first or second switch 10, 20. Furthermore, in order to preserve the appearance of the interior of the car, the wiring 40 and the flash generator 50 are installed inside the car doors.

The car door warning system of the present invention issues a warning signal, as soon as a door handle is moved, effectively discouraging car passengers from opening the car door and cautioning passers-by from behind against coming close.

What is claimed is:

1. A car door warning system activated by a car door handle comprising:

a warning device with at least one lighting device;

a switch operated by motion of the door handle, said switch is electrically connected to said warning device; wherein moving the door handle to open the car door actuates said switch such that an electrical signal is transmitted to said warning device, thereby actuating said warning device and lighting said lighting device to generate a warning signal;

each of a plurality of doors of a car is provided with at least one switch operated by motion of a corresponding door handle all of said switches are powered by a common power supply;

said system includes a first switch actuated by an inner door handle and a second switch actuated by an outer door handle.

2. The car door warning system as defined in claim 1 wherein:

said first switch and said second switch are affixed by adhesives.

3. The car door warning system as defined in claim 1 wherein:

said warning device includes a sound generator.

4. The car door warning system as defined in claim 1 wherein:

said lighting device is a lamp.

5. The car door warning system as defined in claim 1 wherein:

said lighting device comprises a plurality of light emitting diodes.

6. The car door warning system as defined in claim 1 wherein:

said warning device further comprises a flash generator such that said lighting device flashes when said warning device is actuated.

7. The car door warning system as defined in claim 1 wherein:

said switch is constructed as an element of said door handle.

\* \* \* \* \*